(12) United States Patent
Lam et al.

(10) Patent No.: US 7,017,150 B2
(45) Date of Patent: Mar. 21, 2006

(54) METHOD AND APPARATUS FOR AUTOMATICALLY ISOLATING MINIMAL DISTINGUISHING STIMULI IN DESIGN VERIFICATION AND SOFTWARE DEVELOPMENT

(75) Inventors: William K. Lam, Newark, CA (US);
Victor Chang, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 675 days.

(21) Appl. No.: 09/943,209

(22) Filed: Aug. 29, 2001

(65) Prior Publication Data
US 2003/0051232 A1 Mar. 13, 2003

Related U.S. Application Data

(60) Provisional application No. 60/313,763, filed on Aug. 20, 2001.

(51) Int. Cl.
*G06F 9/44* (2006.01)
(52) U.S. Cl. .................................................... 717/124
(58) Field of Classification Search ................ 717/124, 717/126, 149, 154, 101, 106; 714/25–38, 714/724, 736, 741; 702/186, 196
See application file for complete search history.

(56) References Cited

U.S. PATENT DOCUMENTS

| | | | | |
|---|---|---|---|---|
| 4,595,981 A | * | 6/1986 | Leung | 714/38 |
| 5,159,600 A | * | 10/1992 | Chintapalli et al. | 714/738 |
| 5,193,178 A | * | 3/1993 | Chillarege et al. | 714/25 |
| 5,634,098 A | * | 5/1997 | Janniro et al. | 714/38 |
| 5,754,760 A | * | 5/1998 | Warfield | 714/38 |
| 5,758,061 A | * | 5/1998 | Plum | 714/35 |
| 5,828,883 A | * | 10/1998 | Hall | 717/133 |
| 6,173,440 B1 | * | 1/2001 | Darty | 717/130 |
| 6,513,154 B1 | * | 1/2003 | Porterfield | 717/101 |
| 6,735,581 B1 | * | 5/2004 | Tokuda et al. | 706/52 |

OTHER PUBLICATIONS

Zambelich, K., "Totally Data-driven Automated Testing", copyrigt 1998, White Paper, <http://www.dkl.com/pdf/datadrive.pdf> or <http://www.sqa-test.com/w_paper1.html>.*

Agrawal et al., "Debugging with Dynamic Slicing and Backtracking", Software Practice & Experience vol., 23(6), pp 589-616, Jun. 1993.*

* cited by examiner

*Primary Examiner*—Anil Khatri
*Assistant Examiner*—Tuan A. Vu
(74) *Attorney, Agent, or Firm*—Osha Liang LLP

(57) ABSTRACT

The invention provides a method for detecting and isolating software bugs and generating a minimal set of stimuli to reproduce the bugs. The present invention utilizes a recursive algorithm to compare the output of successively smaller software blocks of a program in development to a verified output sample. The smallest software blocks which are found to contain a bug are isolated. For each of these isolated blocks, the smallest input vector is determined such that the application of this vector to the block expresses the bug. The present invention utilizes a separate recursive algorithm to determine these minimal vectors.

8 Claims, 7 Drawing Sheets ethod
METHOD AND APPARATUS FOR AUTOMATICALLY ISOLATING MINIMAL DISTINGUISHING STIMULI IN DESIGN VERIFICATION AND SOFTWARE DEVELOPMENT Applicant hereby claims priority to U.S. application Ser. No. 60/313,763 filed on Aug. 20, 2001.

BACKGROUND OF THE INVENTION

1. Field of the Invention

The present invention relates to a method for isolating minimal distinguishing stimuli in design verification and software development.

2. Background Art a. Computers and Software

A computer has a central "brain" called a processor that controls what the computer is going to do. The processor does this by doing a series of tasks or operations, and doing them very quickly. The thing that determines which tasks or operations a processor is going to do is called a program.

A program is a long list of instructions that tell the processor what to do. The processor typically gets one instruction at a time, performs some operation based on the instruction, and then moves to another instruction, and so on. The processor does not necessarily perform the instructions of a program in order. Instead, the processor can jump around. It may execute two or three instructions in a row, then based on the results of those instructions, jump back, skip ahead, or continue in sequence. The processor may even begin executing another program before it has completed the first, or it may decide to stop altogether.

Like books, computer programs must be written. The person who writes programs is called a programmer, or software developer.

b. Software Development

Software development is the writing of a computer program. Software development typically proceeds in several stages. The first step is that the software is written. This is a substantial effort, as many computer programs contain hundreds of thousands of lines. (A program is typically written in what is called a software code or language, so a program is often said to have so many lines of "code"). After a program is written it must then be tested. If there is something wrong with the software it must then be fixed. Once the software is fixed, the development process is complete and the program is ready to use.

The testing and fixing of software is an important part of the software development process and can be very time consuming. An error in a program is called a "bug" and the process of finding and removing software bugs is called "debugging".

c. Debugging Software

One way of debugging software is to determine if the program fails when the program is used. This process may be automated—a separate program often called a test case or test program is used to test the software being developed. The test program is such that if the program works correctly, some predicted results will occur. During testing, every line of code in the program is tested. A bug is found when the actual results of the test differ from the predicted results. The bug can involve improperly managed data, abnormal program termination, or even an operating system crash.

Once a bug is found, the developer tries to fix the bug by rewriting the code in the area where the bug occurred. After the code is rewritten, the programmer would like to be able to re-test the program to determine if the fix was successful. This means that the programmer wants to be able to reproduce the condition (called an error condition) that revealed the bug in the first place. If the error condition can't be reproduced, you can't be sure if you really fixed the bug. In this sense, debugging software is like trying to repair a car that is "making a funny noise". If the car makes the noise when you drive, but does not make the noise when the mechanic looks at the car, the mechanic can't figure out what is wrong with the car. A driver needs to be able to make the car make the noise so the mechanic can fix it. Then, after the car is fixed, the driver wants to do the same things that in the past made the noise to see if the repair was successful.

Like the driver, the programmer needs to be able to reproduce the error condition at will so that the bug can be fixed. If the programmer cannot reproduce the error condition, he cannot be certain with a high probability that the bug has been fixed.

A problem in debugging is that the programmer must retrace too many steps in the process so as to recreate the error condition. Consider when the developer runs the test case and after several minutes, an error condition occurs. This may be after several hundred thousand lines of code have been executed. In order to recreate the error condition, the programmer may be forced to rerun the entire test to the exact place and time to duplicate the error. This process wastes valuable time and money. Currently the prior art has not provided a good way to easily and automatically recreate an error condition in tested software.

SUMMARY OF THE INVENTION

The invention provides a method for detecting and isolating software bugs and generating a minimal set of stimuli to reproduce the bugs.

The present invention utilizes a recursive algorithm to compare the output of successively smaller software blocks of a program in development to a verified output sample. The smallest software blocks which are found to contain a bug are isolated. These blocks are named minimal modules.

For each minimal module, the smallest input vector is determined such that the application of this vector to the module expresses the bug. The present invention utilizes a separate recursive algorithm to determine these minimal vectors.

The use of recursive algorithms in software design is well known in the art. Recursion is the repeated application of a procedure to a preceding result to generate a sequence of values. This process continues until the program encounters a termination condition. An example of recursive software design is in the calculation of a factorial. The factorial of a number n, n!, is the product of all numbers from 1 to n. So for n=4, n!=4 * 3 * 2 * 1 or 24. This procedure is represented in pseudocode as:

```
function factorial(integer n) : integer;
begin
    if n > 1 then
        return n * factorial(n – 1)
    else return n;
end;
```

In this example, the function determines the factorial for parameter n by multiplying n by the result of a recursive call to the function with the preceding integer (n−1). This recursive process continues until the termination condition, namely n=1, is reached. At this point, the function returns and multiplies the succeeding value of n by that which is currently returned. So for 4! at the last recursive level, n=1. At the next to last recursive level, n=2 and 2 * 1=2. At the preceding recursive level, n=3 and 3 * 2 * 1=6. Finally at the top level, n=4 and 4 * 3 * 2 * 1=24.

In the preferred embodiment of the present invention, an automated software algorithm feeds a series of input vectors into a large application under development. This application may be an entire CPU design with hundreds of thousands of test vectors. This application is called the D-system. These test vectors are also applied to a verification system named the G-system. The G-system produces the correct output vector for any test vector in the D-system. The resultant vectors of these two systems are compared for all nodes of the D-system—input, output and internal. If all comparisons are equal, then the D-system passes the verification test. Otherwise, the D-system is recursively processed to isolate minimal modules and minimal input vectors.

In practice, a programmer will fix the isolated bugs based on the results of the present invention. The debugged application may then be tested again in accordance with the present invention. This process is repeated until the D-system passes the equivalence test.

DETAILED DESCRIPTION OF THE INVENTION

The invention is a method for generating efficient debugging test cases. In the following description, numerous specific details are set forth to provide a more thorough description of the embodiments of the invention. It is apparent, however, to one skilled in the art, that the invention may be practiced without these specific details. In other instances, well known features have not been described in detail so as to not obscure the invention.

Figure 1:
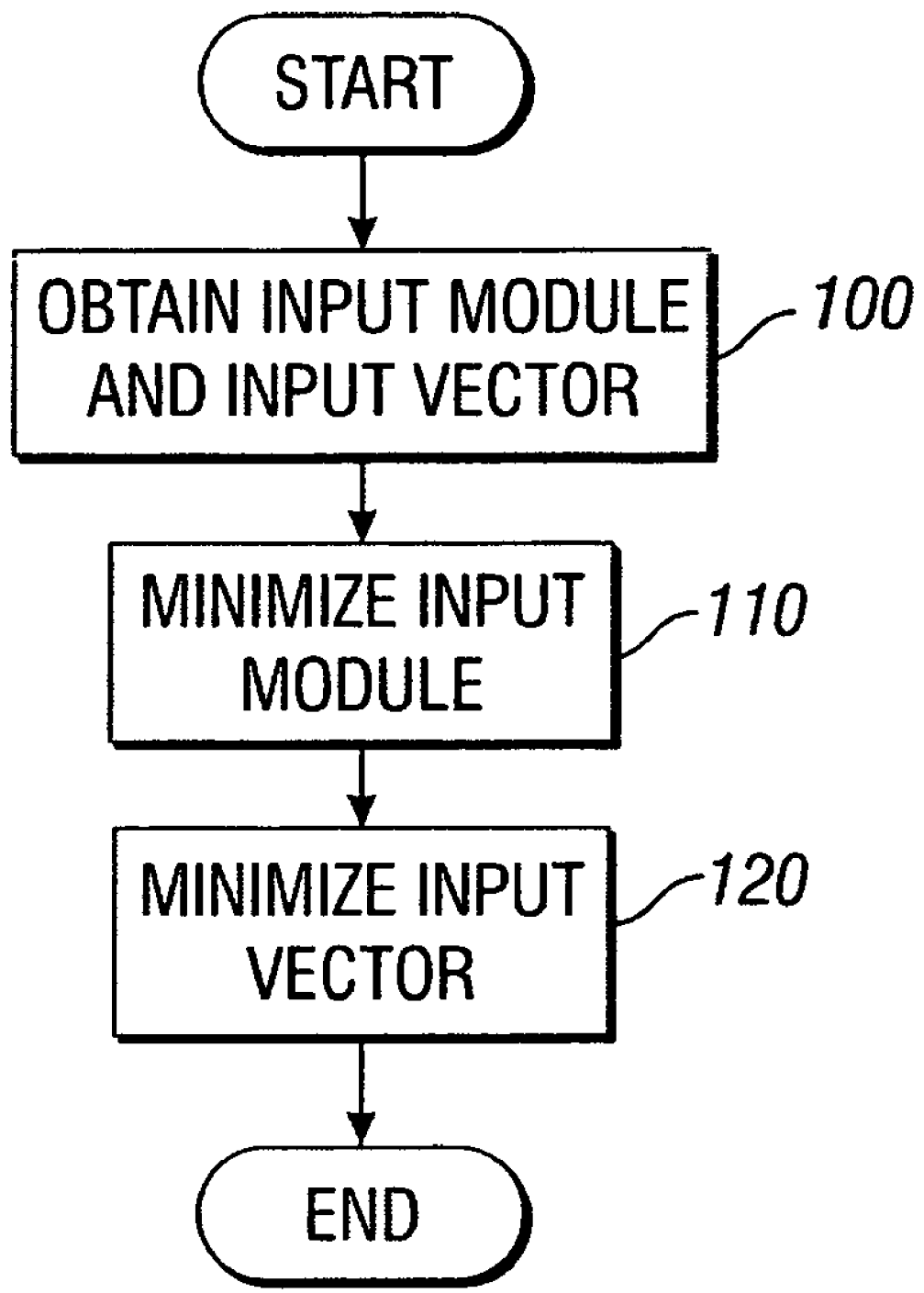
FIG. 1 is a flow diagram showing an embodiment of the debugging method and program in accordance with the present invention.

The embodiments of the present invention will now be described in conjunction with the accompanying drawings. FIG. 1 is a flow diagram showing an embodiment of the debugging method and program in accordance with the present invention. In step 100, an input module and input vector are obtained for testing. The input module may be a complex system; for example, an entire CPU design with hundreds of thousands of test vectors. This system is called a "D-system." At step 110, a set of minimal modules is generated for each test vector that produces an error condition. A minimal module is defined as the smallest possible submodule of the input module in which the test vector still produces an error condition. At step 120, a minimal vector is generated for each isolated bug. A minimal vector is defined as a vector which cannot be subdivided and which still produces an error in the minimal module. The expected result at the end of the process depicted in FIG. 1 is the generation of a set of minimal modules coupled with corresponding minimal vectors for a given pair of input module and input vector.

1. Minimize Software Modules

The operation of step 110 is now described with reference to the flowcharts in FIG. 2 and FIG. 3.

Figure 2A:
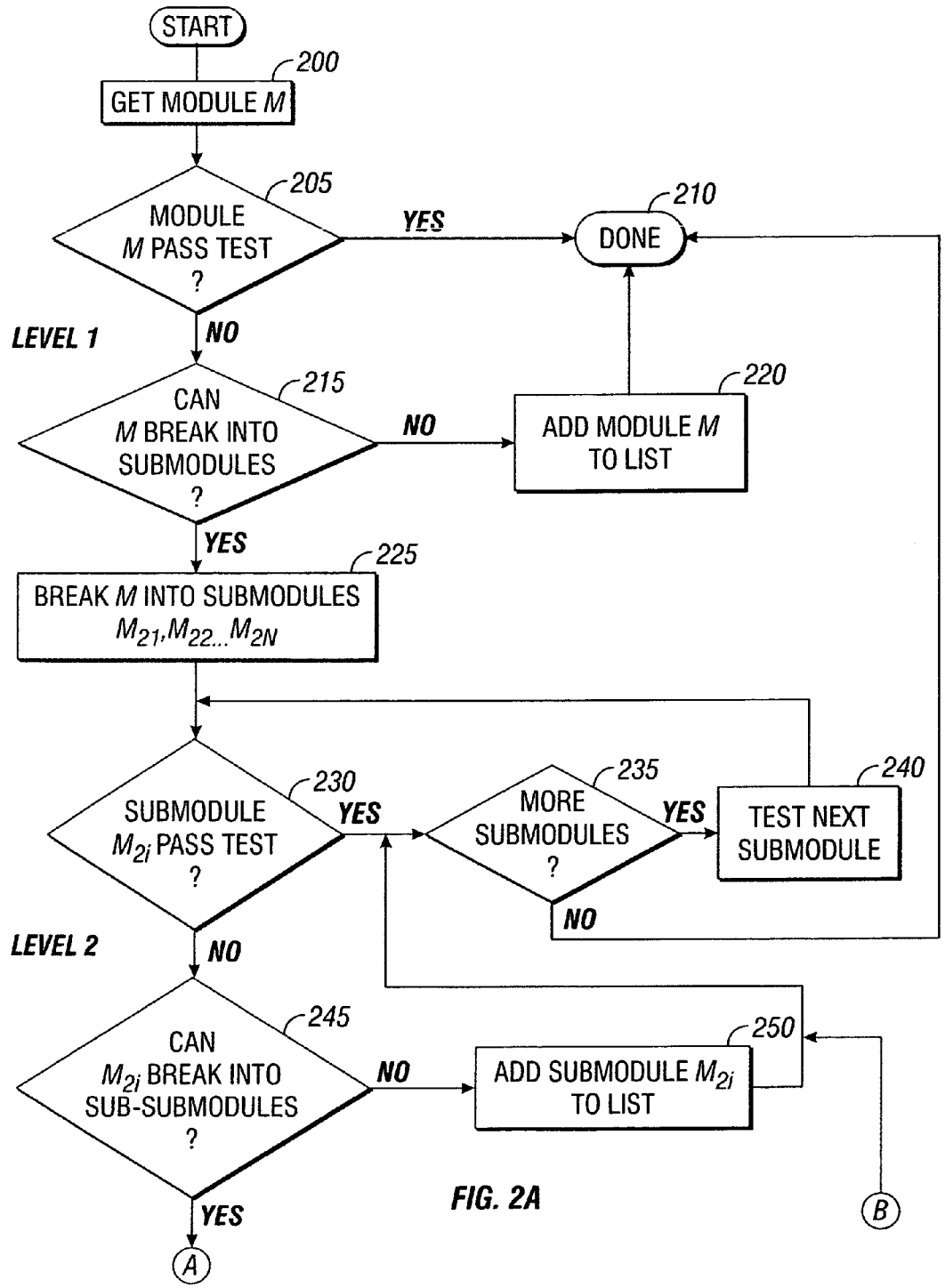
FIGS. 2A and 2B are flow diagrams of the minimal module selection algorithm in which the recursive nature of the algorithm is made explicit.

FIG. 2 illustrates the recursive nature of the minimal module selection algorithm of the invention. At Level 1, the algorithm is processing the entire application as a module. In step 200, the algorithm obtains the module. The module is tested in step 205 to determine whether the D-system is bug-free. If so, the algorithm returns in step 210 with no further testing. If not, a determination is made in step 215 as to whether the module can be subdivided. A negative result indicates that the D-system itself is a minimal module. In this case, the system is added to an output list (O) in step 220. At this point, no further processing is possible and the algorithm terminates in step 210.

In step 225, the D-system is divided into submodules in response to a positive determination in step 215. At this point, the system processes each submodule in a recursive manner. The steps outlined in Level 2 and all subsequent levels are similar. As each level is reached, the algorithm is processing a submodule of a submodule until the current submodule cannot be subdivided. A minimal module is identified as the highest submodule level at which the error condition can be reproduced. When the minimal module is found, it is added to O.

At Level 2, a determination is made in step 230 as to whether the current submodule passes the equivalency test. If so, then the algorithm iterates the list of submodules in turn through step 230 via steps 235 and 240. If the last submodule in the list passes the equivalency test of step 230, then all submodules have been tested and the algorithm terminates via step 210.

If the submodule fails the equivalency test of step 230, then a determination is made in step 245 as to whether it can be subdivided. A negative result indicates that a minimal module has been found. The submodule is added to O in step 250. Processing of the list of submodules then continues in step 235.

Figure 2B:
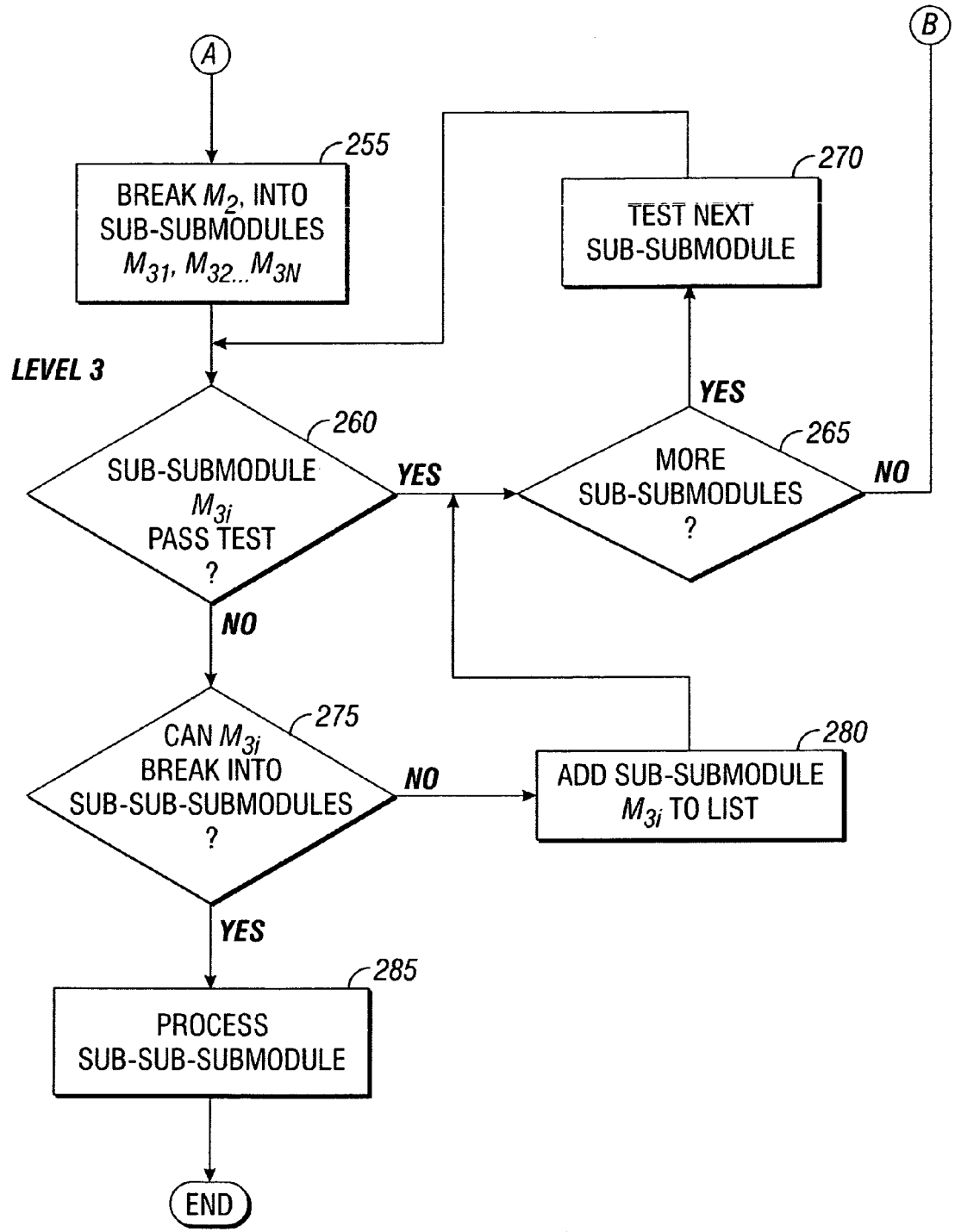

Continuing with FIG. 2B, if the submodule can be subdivided, then a list of sub-submodules comprising the submodule is generated in step 255. At this point, the algorithm enters recursive Level 3 and begins processing of the current sub-submodule list.

In step 260 a determination is made as to whether the current sub-submodule passes the equivalence test. If so, the algorithm iterates the list of sub-submodules in turn through step 260 via steps 265 and 270. If the last sub-submodule in the list passes the equivalency test of step 260, then all sub-submodules have been tested and the algorithm returns to Level 2, where processing of the submodule list continues.

If the sub-submodule fails the equivalency test of step 260, then a determination is made in step 275 as to whether it can be subdivided. A negative result indicates that a minimal module has been found. The sub-submodule is added to O in step 280. Processing of the list of sub-submodules then continues in step 265.

If the result of step 275 is positive, then the sub-submodule is further processed in step 285. The algorithm finally terminates when the last minimal module in the recursive hierarchy is processed. The expected result at the end of the process depicted in FIG. 2 is the generation of a set of minimal modules for a given module.

Figure 3:
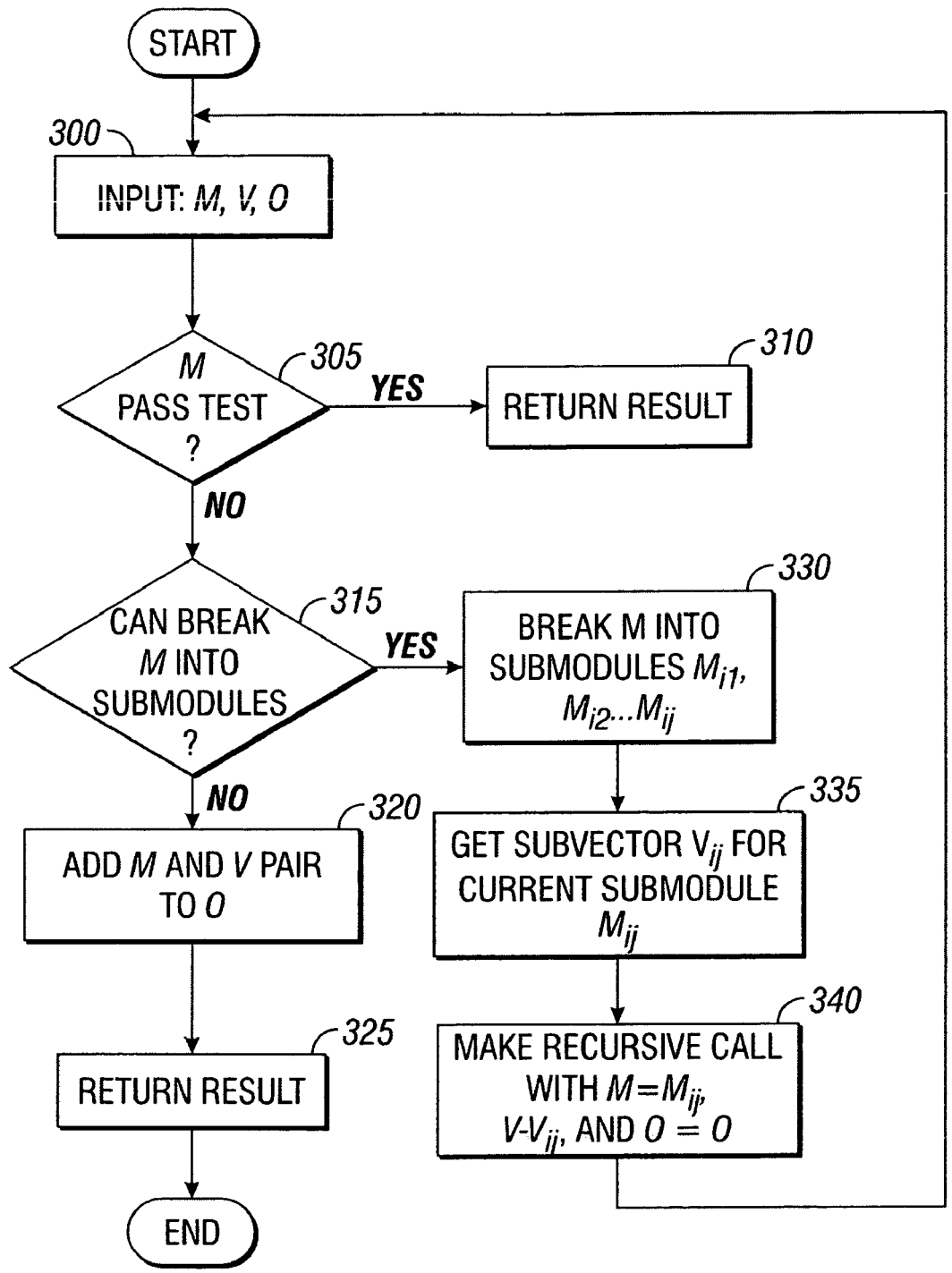
FIG. 3 is a flow diagram illustrating the minimal module selection algorithm.

FIG. 3 is a flow diagram illustrating the implementation of the minimal module selection algorithm for a test application for module (M) and test vector (V). In step 300, a module, a test vector and an output list (O) is obtained. In FIG. 3, O is defined as a list containing pairs of minimal modules and input vectors. O is empty in a bug-free application.

In step 305, a determination is made as to whether M passes an equivalence test. For any input vector presented to the algorithm, the ideal output vector for M is simulated in a "golden system," or "G-system." M passes the test where the actual output and the ideal output are similar. A positive result indicates that no bugs exist in the immediate module of the D-system. In step 310, the algorithm terminates processing the current module and returns.

If step 305 produces in a negative result, then a further determination is made in step 315 as to whether the current module can be broken into submodules. If so, a list of submodules $M_{i1}, M_{i2} \ldots M_{ik}$ is generated in step 330. For each submodule $M_{ij}$ in the list, the function first generates a test vector $V_{ij}$ in step 335. This test vector is created by simulating the current module with the current test vector and capturing the inputs $V_{1j}$ at the submodule $M_{ij}$. The function then makes a recursive call to itself 340 with $M_{ij}$, $V_{1j}$ and O as inputs.

If a negative determination is made at step 315, then M is a minimal module. In step 320, M and V are appended to O. The algorithm returns in step 325 and continues processing the next submodule in the current list at 335. After the last submodule in the current list is processed, the algorithm continues processing with the next submodule in the parent submodule list, again at step 335.

The final result of the process depicted in FIG. 3 is an output list containing all the smallest submodules, sub-submodules, or any further even smaller modules containing bugs. In this way, a programmer can fix these bugs without searching through the entire application to locate and fix the errors.

In one embodiment, the present invention minimizes the input vectors to accomplish this task.

2. Minimize Input Vectors

For each minimal module-input vector pair returned by the minimal source locator block 110, the vector must be trimmed so that a minimal vector is found. A minimal vector is defined as an input vector which cannot be subdivided and creates a problem in the associated minimal module.

Figure 4:
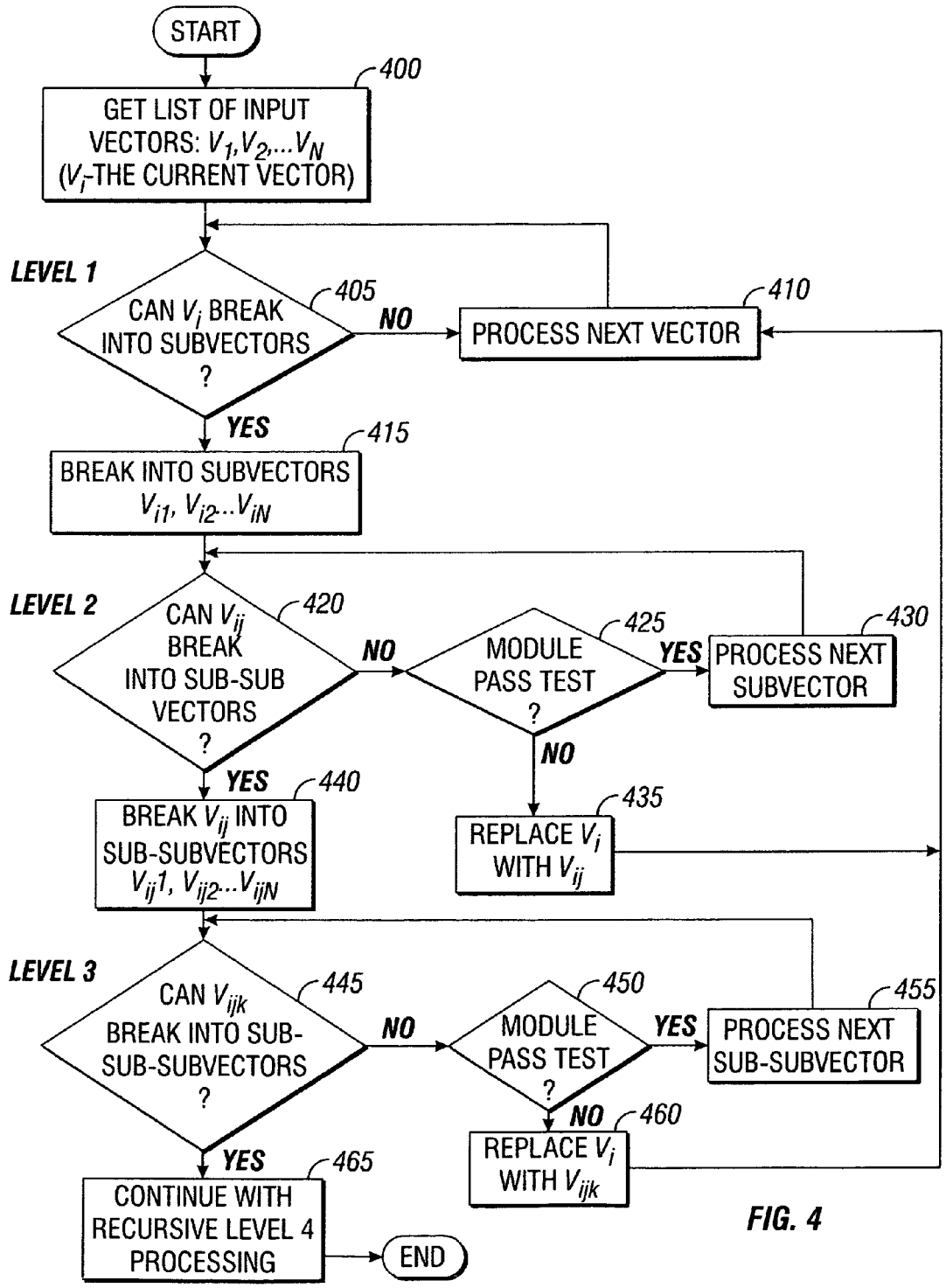
FIG. 4 is a flow diagram of the vector trimming algorithm in which the recursive nature of the algorithm is made explicit.

FIG. 4 illustrates the recursive nature of the vector-trimming algorithm of the invention. At Level 1, the algorithm is processing a list of whole input vectors 400. For each input vector, a determination is made in step 405 as to whether the vector can be broken into a number of subVectors. If no, then a minimal vector has been found. In step 410, the algorithm iterates the list of input vectors through step 405.

If a positive determination is made in step 405, then a list of subVectors $V_{i1}, V_{i2} \ldots V_{1n}$, which together comprise input Vector $V_i$, is generated in step 415.

At Level 2, the algorithm has called itself with the list of subVectors generated at Level 1. In step 420, a similar determination is made as in step 405. If the result is positive, then at step 440 the algorithm generates a separate list of sub-subVectors, $V_{ij1}, V_{ij2} \ldots V_{ijn}$. This list contains the input vectors which comprise subVector $V_{ij}$, an input vector in the list passed to Level 2 processing. The algorithm then calls itself with this list, and Level 3 processing commences.

If the result of step 420 is negative, then a nondivisible vector is found. In this case, a determination is made in step 425 as to whether the subVector recreates the error condition. If the application of the subVector to the minimal module causes the module to fail the comparison test, then a minimal vector is found. $V_i$, the topmost vector in the recursive hierarchy, is replaced by $V_{ij}$ in step 435. The algorithm then returns to Level 1 to process the next Vector.

If the result of step 425 is positive, then the next subvector in the subvector list is obtained 430 and tested in step 420.

If the algorithm reaches recursive Level 3, then in step 445 a determination is made as to whether the sub-sub Vector may be broken into a list of sub-sub-subVectors. If so, then the algorithm continues with recursive Level 4 processing in step 465.

If the result of step 445 is negative, then a nondivisible vector is found. In this case, a determination is made in step 450 as to whether the sub-subvector recreates the error condition. If the application of the sub-subvector to the minimal module causes the module to fail the comparison test, then a minimal vector is found. $V_i$, the topmost vector in the recursive hierarchy, is replaced by $V_{1jk}$ in step 460. The algorithm then returns to Level 1 to process the next Vector.

If the result of step 450 is positive, then the next sub-subVector in the sub-subvector list is obtained 455 and tested in step 445. The expected result at the end of the process depicted in FIG. 4 is the generation of a set of minimal vectors for a list of input vectors.

The algorithm finally terminates when the minimal vector is determined for the last minimal module in O.

Figure 5:
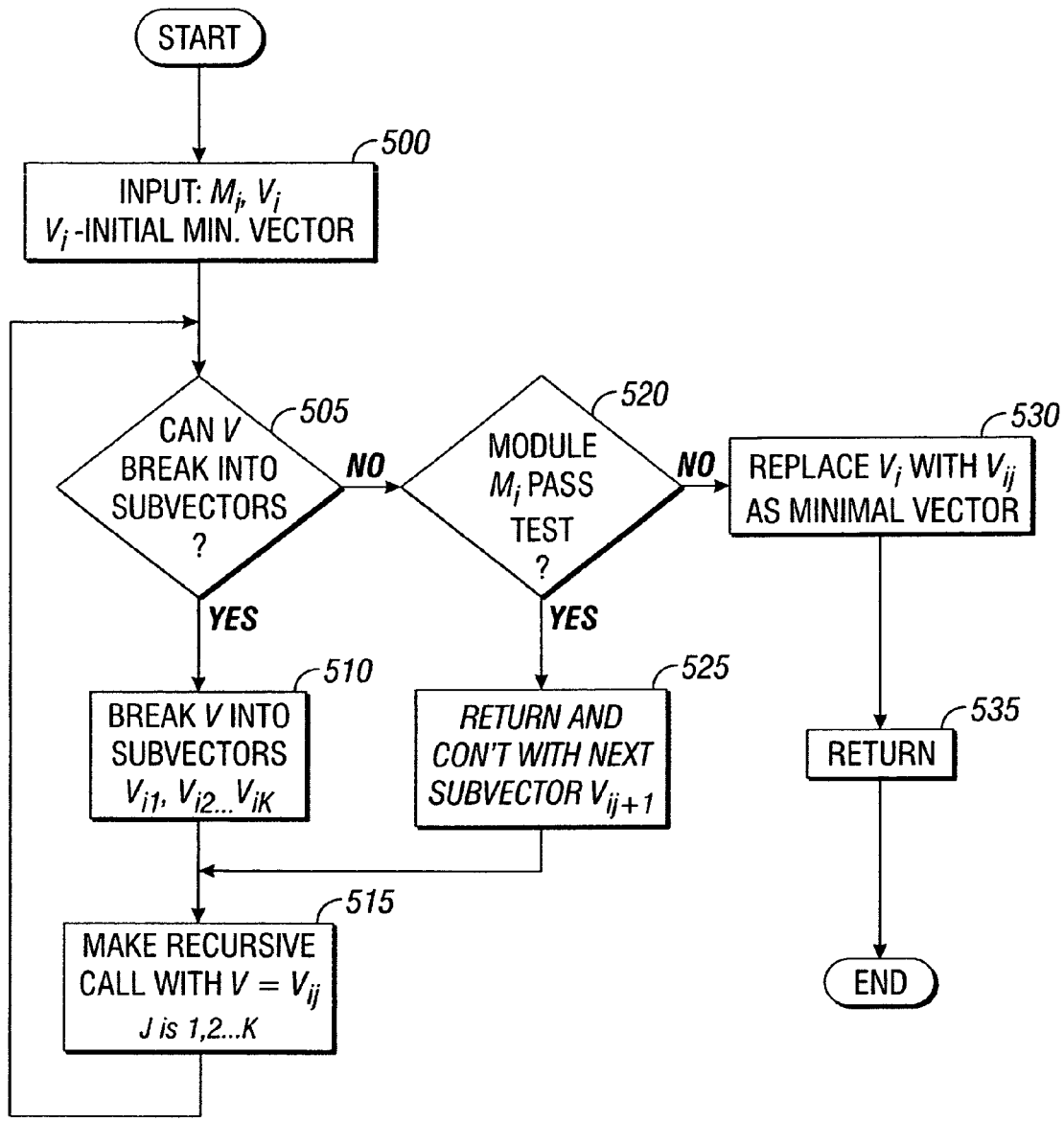
FIG. 5 is a flow diagram illustrating the vector trimming algorithm.

Now with the understanding of vector trimming algorithm and minimal vectors, it is helpful to further expand on the processing of a single module-vector pair mentioned in FIG. 3. FIG. 5 is a flow diagram illustrating the implementation of the vector trimming algorithm for a single module-vector pair 500. At step 505 a determination is made as to whether the input vector, $V_i$, can be broken into a set of subVectors, $V_{i1}, V_{i2} \ldots V_{ik}$. If so, a list of subVectors, $V_{i1}, V_{i2} \ldots V_{ik}$, is generated in step 510. For each subVector, the algorithm calls itself recursively in step 515, replacing $V_i$ with the current subVector $V_{ij}$.

If the result of step 505 is negative, then a nondivisible vector has been found. At this point, in step 520, a determination is made as to whether the module M satisfies the equivalence test with input vector $V_i$. If so, then the current subVector at recursive level j (i.e. the $2^{nd}$ level, $V_i$ is $1^{st}$ level and $V_{ij}$ is $2^{nd}$ level) does not recreate the error condition. The algorithm returns in step 525 to step 515 and the next subVector at recursive level j is tested.

If the result of step 520 is negative, then a minimal vector has been found. Vector $V_i$ is replaced with subVector $V_{ij}$ in step 530, and the algorithm returns in step 535 without continuing along the recursive hierarchy in step 515. The expected result at the end of the process depicted in FIG. 5 is the generation of the minimal vector for a given minimal module.

The generation of a minimal input vector for each minimal module enhances the efficiency of the debugging process. The use of a minimal module alerts the programmer to those areas of software code where a bug exists. The use of minimal test vectors alerts the programmer to those use cases in which the error condition is expressed. Bugs are fixed rapidly and software is tested with certainty.

As a series of bugs is fixed, the application may be retested in the present invention. Any bugs introduced into the application as a result of the debugging process are found, isolated and in turn, fixed. This cycle is repeated until the application as a whole passes the equivalency test.

3. Embodiment of Computer Execution Environment (Hardware)

Figure 6:
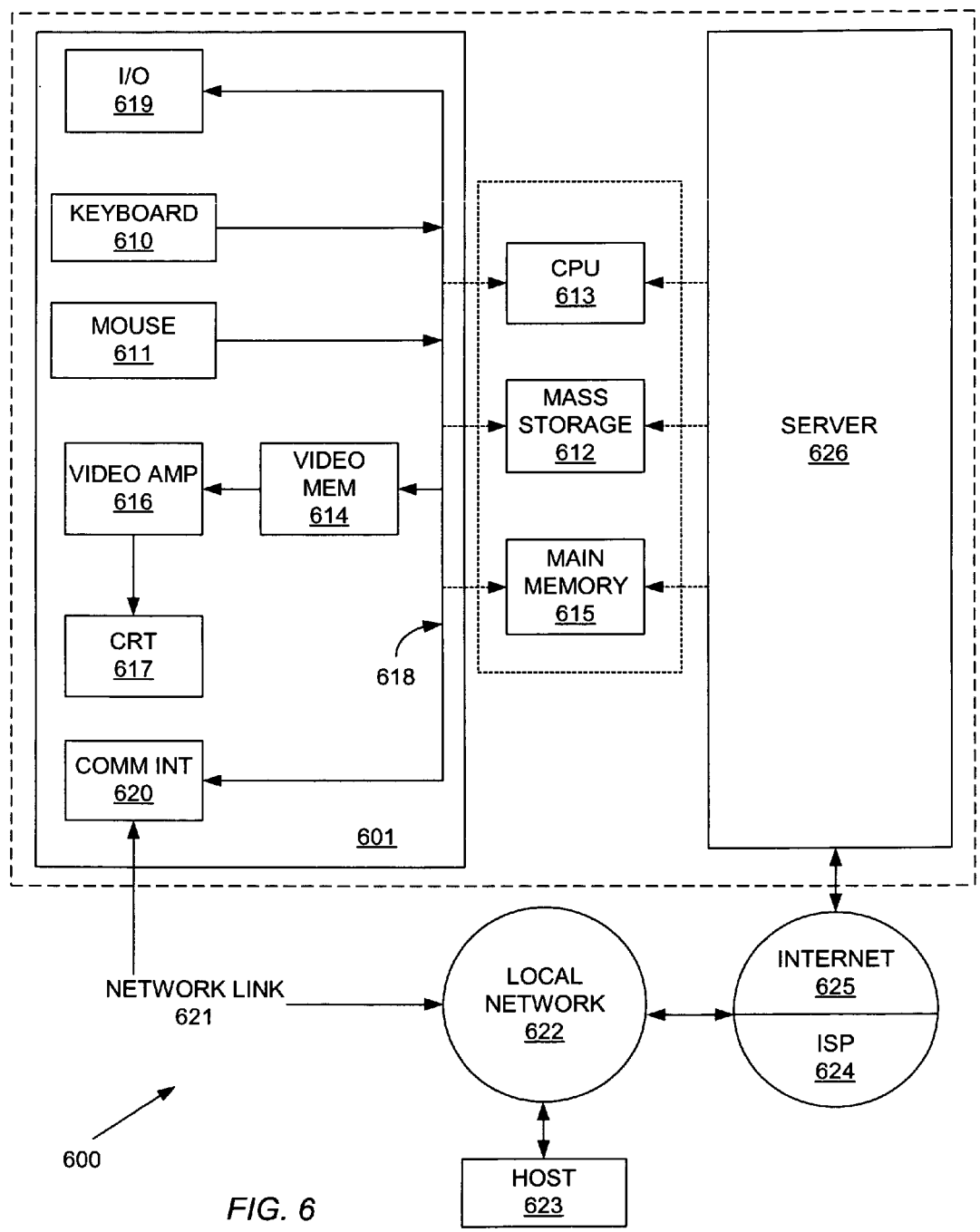
FIG. 6 is an embodiment of a computer execution environment in which one or more embodiments of the present invention can be implemented.

An embodiment of the invention can be implemented as computer software in the form of computer readable program code executed in a general purpose computing environment such as environment 600 illustrated in FIG. 6, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 610 and mouse 611 are coupled to a system bus 618. The keyboard and mouse are for introducing user input to the computer system and communicating that user input to central processing unit (CPU) 613. Other suitable input devices may be used in addition to, or in place of, the mouse 611 and keyboard 610. I/O (input/output) unit 619 coupled to bi-directional system bus 618 represents such I/O elements as a printer, A/V (audio/video) I/O, etc.

Computer 601 may include a communication interface 620 coupled to bus 618. Communication interface 620 provides a two-way data communication coupling via a network link 621 to a local network 622. For example, if communication interface 620 is an integrated services digital network (ISDN) card or a modem, communication interface 620 provides a data communication connection to the corresponding type of telephone line, which comprises part of network link 621. If communication interface 620 is a local area network (LAN) card, communication interface 620 provides a data communication connection via network link 621 to a compatible LAN. Wireless links are also possible. In any such implementation, communication interface 620 sends and receives electrical, electromagnetic or optical signals which carry digital data streams representing various types of information.

Network link 621 typically provides data communication through one or more networks to other data devices. For example, network link 621 may provide a connection through local network 622 to local server computer 623 or to data equipment operated by ISP 624. ISP 624 in turn provides data communication services through the world wide packet data communication network now commonly referred to as the "Internet" 625. Local network 622 and Internet 625 both use electrical, electromagnetic or optical signals which carry digital data streams. The signals through the various networks and the signals on network link 621 and through communication interface 620, which carry the digital data to and from computer 600, are exemplary forms of carrier waves transporting the information.

Processor 613 may reside wholly on client computer 601 or wholly on server 626 or processor 613 may have its computational power distributed between computer 601 and server 626. Server 626 symbolically is represented in FIG. 6 as one unit, but server 626 can also be distributed between multiple "tiers". In one embodiment, server 626 comprises a middle and back tier where application logic executes in the middle tier and persistent data is obtained in the back tier.

In the case where processor 613 resides wholly on server 626, the results of the computations performed by processor 613 are transmitted to computer 601 via Internet 625, Internet Service Provider (ISP) 624, local network 622 and communication interface 620. In this way, computer 601 is able to display the results of the computation to a user in the form of output.

Computer 601 includes a video memory 614, main memory 615 and mass storage 612, all coupled to bi-directional system bus 618 along with keyboard 610, mouse 611 and processor 613. As with processor 613, in various computing environments, main memory 615 and mass storage 612, can reside wholly on server 626 or computer 601, or they may be distributed between the two. Examples of systems where processor 613, main memory 615, and mass storage 612 are distributed between computer 601 and server 626 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 612 may include both fixed and removable media, such as magnetic, optical or magnetic optical storage systems or any other available mass storage technology. Bus 618 may contain, for example, thirty-two address lines for addressing video memory 614 or main memory 615. The system bus 618 also includes, for example, a 32-bit data bus for transferring data between and among the components, such as processor 613, main memory 615, video memory 614 and mass storage 612. Alternatively, multiplex data/address lines may be used instead of separate data and address lines.

In one embodiment of the invention, the processor 613 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 615 is comprised of dynamic random access memory (DRAM). Video memory 614 is a dual-ported video random access memory. One port of the video memory 614 is coupled to video amplifier 616. The video amplifier 616 is used to drive the cathode ray tube (CRT) raster monitor 617. Video amplifier 616 is well known in the art and may be implemented by any suitable apparatus. This circuitry converts pixel data stored in video memory 614 to a raster signal suitable for use by monitor 617. Monitor 617 is a type of monitor suitable for displaying graphic images.

Computer 601 can send messages and receive data, including program code, through the network(s), network link 621, and communication interface 620. In the Internet example, remote server computer 626 might transmit a requested code for an application program through Internet 625, ISP 624, local network 622 and communication interface 620. The received code may be executed by processor 613 as it is received, and/or stored in mass storage 612, or other non-volatile storage for later execution. In this manner, computer 600 may obtain application code in the form of a carrier wave. Alternatively, remote server computer 626 may execute applications using processor 613, and utilize mass storage 612, and/or video memory 615. The results of the execution at server 626 are then transmitted through Internet 625, ISP 624, local network 622 and communication interface 620. In this example, computer 601 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

What is claimed is:

1. A computer-implemented method of debugging software comprising:
    obtaining a software module;
    obtaining a first input test vector;
    obtaining a bug list, wherein said bug list comprises a minimal set of stimuli to reproduce a software bug in said software module;
    generating a first output vector by applying said first input test vector to said software module;
    applying a comparison test to said first output vector to determine whether a bug exists in said software module;
    applying a module decomposition test to said software module when the result of said comparison test is positive;
    obtaining a module decomposition list comprising two or more submodules of said software module and iteratively processing said module decomposition list when the result of said module decomposition test is positive, wherein iteratively processing said module decomposition list comprises removing at least one submodule; and
    appending said software module and said first input test vector to said bug list when said software module is a minimal module based on module decomposition list as determined by the module decomposition test.

2. The method of claim 1 wherein said comparison test comprises:
    obtaining an optimal result vector;
    comparing said first output vector to said optimal result vector; and
    determining whether said first output vector is at variance with said optimal result vector.

3. The method of claim 1 wherein the iterative processing step comprises:
    obtaining a second input test vector such that the application of said second input test vector to said two or more submodules generates a second output test vector; and
    recursively processing said two or more submodules and said second output test vector.

4. The method of claim 3 wherein the recursively processing step comprises:
    obtaining said minimal module;
    obtaining said first input test vector; and
    applying a vector decomposition test to said first input test vector.

5. The method of claim 4 further comprising:
    generating a third output vector by applying said first input test vector to said minimal module when the result of said vector decomposition test is negative;
    applying said comparison test to said third output vector to determine whether said first input test vector recreates the bug; and
    appending said input test vector to a test list when the result of said comparison test is positive.

6. The method of claim 5 further comprising:
    obtaining a vector decomposition list comprising two or more subvectors of said first input test vector when the result of said vector decomposition test is positive; and
    iteratively processing each entry in said vector decomposition list by recursively applying said vector decomposition test to said subvectors.

7. The method of claim 6 in which said software module and said input test vector are obtained by iterating through the entries in said bug list.

8. A computer system for debugging software comprising:
    a processor;
    a memory;
    a storage device; and
    software instructions stored in the memory for enabling the computer system under control of the processor, to:
    obtain a software module;
    obtain a first input test vector;
    obtain a bug list, wherein said bug list comprises a minimal set of stimuli to reproduce a
    software bug in said software module;
    generate a first output vector by applying said first input test vector to said software module;
    apply a comparison test to said first output vector to determine whether a bug exists in said software module;
    apply a module decomposition test to said software module when the result of said comparison test is positive;
    obtain a module decomposition list comprising two or more submodules of said software module and iteratively processing said module decomposition list when the result of said module decomposition test is positive, wherein iteratively processing said module decomposition list comprises removing at least one submodule; and
    append said software module and said first input test vector to said bug list when said software module is a minimal module based on module decomposition list as determined by the module decomposition test.

* * * * *